United States Patent [19]
Whetham

[11] 3,777,125
[45] Dec. 4, 1973

[54] DEMODULATOR FOR MAGNETIC MILLING FORCE SENSORS

[75] Inventor: William J. Whetham, Seattle, Wash.

[73] Assignee: The Boeing Company, Seattle, Wash.

[22] Filed: Jan. 26, 1972

[21] Appl. No.: 220,746

[52] U.S. Cl............ 235/151.11, 90/11 A, 318/571, 318/629, 328/166
[51] Int. Cl........................ G06g 7/66, G05b 11/12
[58] Field of Search................ 235/151.11; 318/565, 318/571, 629, 636, 653; 73/67, 100; 90/11 R, 11 A, 13 R, 13 C; 328/166

[56] References Cited
UNITED STATES PATENTS

| | | | |
|---|---|---|---|
| 3,582,749 | 6/1971 | Wenzel | 318/571 |
| 3,510,740 | 5/1970 | Sylvander et al. | 318/629 |
| 3,277,695 | 10/1966 | Joline | 73/67 X |
| 3,508,444 | 4/1970 | Sitomer et al. | 318/636 X |
| 3,235,810 | 2/1966 | Adams | 328/166 |
| 3,085,166 | 4/1963 | Gogia et al. | 318/629 X |
| 3,602,090 | 8/1971 | Whetham | 318/571 X |

Primary Examiner—Charles E. Atkinson
Assistant Examiner—Jerry Smith
Attorney—Christensen & Sanborn

[57] ABSTRACT

An improved system is provided for sensing spindle deflection of a milling machine and developing a feedrate control signal in accordance therewith to achieve optimum tool life consistant with high metal removal rate from a workpiece. A plurality of magnetic transducers are disposed adjacent the spindle or spindles of a milling machine, and each magnetic transducer is excited by an audio frequency signal such that, as deflection of a spindle brings the spindle closer to or moves it further from a transducer, a corresponding change in the impedance characteristics of the transducer is utilized to develop an a-c signal of a given amplitude. Signals developed from opposing transducers are fed to a differential amplifier to derive a difference signal which is demodulated by a phase detector, rectified and filtered, and then passed through a squaring circuit in order that signals corresponding to the square of the deflection sensed by each transducer pair may be mixed to provide a d-c voltage representing the sum of the squares representing the deflection components. The square root of the sum of the squares is then taken to give a feedback signal proportional to the vector sum of spindle deflection for utilization as a feedrate correction signal. For milling machines utilizing multiple spindles simultaneously, a peak detector circuit is utilized to select the largest sum of the squares only for subsequent development of the feedrate correction signal.

Changes in the resistance of the magnetic transducers due to temperature variations encountered under normal operating conditions are compensated by placing the coil of each magnetic transducer in a series circuit which includes a field effect transistor biased to perform as a variable resistor responsive to a change in current flow through the coil by presenting an apparent resistance which opposes the change in current. Runout, which introduces an invalid deflection signal component by modulating the audio frequency reference signal according to the rate of spindle rotation, is compensated by observing the signal produced by runout from each tool holder, tool combination prior to machining, and then providing a continuous equal and opposite signal thereby leaving only the component due to actual spindle deflection. This signal also compensates for component drift. This function is carried out by a loop including a d-c amplifier which drives an A-D converter which, in turn drives a D-A converter which has its output coupled back to the input of the d-c amplifier. When activated, the calibrate circuit introduces trial signal levels until the output of the d-c amplifier is zero, thus negating the effect of runout.

7 Claims, 7 Drawing Figures

DEMODULATOR FOR MAGNETIC MILLING FORCE SENSORS

BACKGROUND OF THE INVENTION

This invention relates to automatically controlled milling machines and, more particularly, to an improved controller and milling force sensor for such systems.

In a machine tool, such as a milling machine, metal removal is accomplished by a cutting tool rotating at a predetermined rate engaging a work piece that is moved at a predetermined feedrate and direction with respect to the cutting tool.

With manually operated milling machines, a machine operator selects and subsequently manages a feedrate that, in his judgment, affords an optimum compromise between the speed with which the work piece is completed and mitigation of cutting tool wear and breakage. Generally, the operator errs toward conserving the cutting tool to avoid repeated unnecessary setups. Thus, production rate is, as a practical matter, very much less than optimum with manually operated milling machines.

However, numerically controlled milling machines receive directions, including work piece feedrate, from a digital computer which has had data entered representing the empirical and calculated experience of the milling process to bring about a higher relative production rate which can be attributed to maintaining a more nearly optimum feedrate. Nonetheless, as those skilled in the art will appreciate, the variable factors making up the relationship between cutting tool breakage and wear and maximum metal removal rate renders it virtually impossible to program the digital computer to achieve optimum results. Accordingly, the selection of feedrate for a particular operation with particular metals and particular cutting tools is still largely determined by the experience and caution of the operator in most numerically controlled milling machines. With these systems, a predetermined feedrate is set into the numerical control unit by the digital computer or manually by the operator, and during the milling operation, a manual override including an operator controlled potentiometer is utilized whenever, in the operator's opinion and experience, a situation of potential undue wear or stress or one in which the metal removal rate is too low is encountered. While such systems afford substantially more nearly optimum utilization of the milling machine than strictly manual control, the machine operator still has a tendency to be very conservative in his selection of feedrate such that maximum machine productivity is still not achieved. Since milling machines of the size contemplated are very expensive to purchase, maintain and operate, every increment of increase in net productivity is desirable. Thus, those skilled in the art have given much attention toward devising more nearly fully automatic control systems for the feedrate. For example, close attention has been given to improving the data provided to the digital computer in order that the predetermined feedrate for a given milling operation will be somewhat more refined. Nonetheless, as previously stated, it has proven impossible to rely fully upon this approach because of the many variables associated with each milling operation. Another prior art approach has been to measure the axial load on the cutting tool by hydraulic means which functions to provide an appropriate step reduction in the feedrate when the axial load exceeds a predetermined minimum. Yet another approach has been to sense the torque output and speed of the electric motor which drives eitherthe feed table or the cutting tool and either the modify a preset feedrate in some proportion to changes thereof. Still another approach has been to measure the deflection of the cutting tool and the torque thereon resulting from engagement with the work piece and to accordingly control the operation of the spindle motor and the feed table motor in proportion to a control signal developed frtom a combination of the deflection and torque information.

Although these prior approaches do provide generally satisfactory automatic feedrate control, they have been very expensive to implement and also are very difficult to integrate into an existing numerically controlled or manually operated milling machine. However, it has been discovered that control of feedrate in accordance with milling force only significantly reduces the probability of cutting tool breakage and undue wear while greatly increasing productivity of the machine. Milling force can be determined by sensing cutting tool deflection such that a system responding to milling force only may be incorporated into existing milling machines with little or no modification. Such a system is described and claimed in my U.S. Pat. No. 3,602,090, entitled MILLING MACHINE CONTROL SYSTEM AND MILLING FORCE SENSOR therefor, and it is to an improvement to the system described therein to which the present invention is directed. Briefly, the apparatus described in U.S. Pat. No. 3,602,090 incorporates a sensing unit comprising a plurality of magnetic transducers which are connected in an a-c bridge arrangement, the transducers being so disposed with respect to a milling machine spindle that the bridge output is proportional to spindle deflection. A demodulator circuit converts the bridge output into a suitable milling force signal utilized to modify the predetermined reference milling force entered by an operator to form a digital computer.

SUMMARY OF THE INVENTION

Experience with the system disclosed in U.S. Pat. No. 3,602,090 has indicated that the means for demodulating the sensed deflection signal is subject to the modulation of spurious signal components, particularly components in quadrature to the signal components representing true deflection.

It is therefore a broad object of this invention to provide an improved demodulating means for converting an a-c signal representative of spindle deflection to a corresponding d-c signal for development into a feedrate correction signal.

It is another object of this invention to provide such means which achieves high rejection of undesirable signal components, particularly quadrature components.

Briefly, these and other objects of the invention are achieved by feeding signals developed from magnetic transducers, diametrically opposed and disposed radially outwardly from the spindle periphery, to a differential amplifier to derive a different signal which is demodulated by a phase detector excited from the same a-c source utilized to excite the magnetic transducer. Thus, spurious signal components in quadrature average out to zero to produce a pulsating d-c which may be filtered and passed through a squaring circuit for subsequent combination with similar signals developed from transducers disposed in other axes about the spindle for ultimate development of a square root of the sum of the squares signal which represent a true force vector of the deflection.

BRIEF DESCRIPTION OF THE DRAWINGS

The subject matter of this invention is particularly pointed out and distinctly claimed in the concluding portion of the specification. The invention, however, both as to organization and method of operation, may best be understood by reference to the following description taken in conjunction with the accompanying drawings of which:

DESCRIPTION OF A PREFERRED EMBODIMENT

Figure 1:
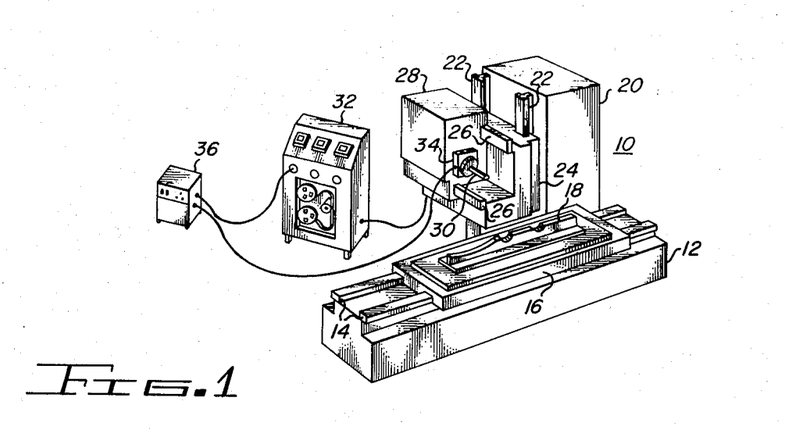
FIG. 1 is a pictorial diagram of a numerically controlled milling machine.

Referring now to FIG. 1, a milling machine 10 is suppled with control signals from a numerical control or N/C unit 32. Numerical control units of this type are well known to the art and generally comprise digital computer circuits which convert the information on a preprogrammed tape into control signals for milling machine 10. Of course, for different milling operations and for different workpieces, different preprogrammed tapes are required. Included in each tape are a plurality of instructions which define the details of a machining process necessary to produce a finished workpiece of desired dimension and tolerances. One of these instructions may include the desired feedrate in the three coordinate directions throughout the milling process. It is also common for the operator to manually override the feedrate of the numerical control unit during each step of the milling process. For purposes of illustration only, the feedrate control system hereinafter described will relate to feedrate control in the longitudinal or X-direction.

The automatic feedrate control system is provided with a sensor housing 34 which is disposed in proximity to the spindle of cutter mechanism 28. According to the teachings of this invention, the improved milling force sensor in housing 34 provides an output signal related to the actual milling force exerted on the spindle or cutter of the milling machine. This output signal is determined solely from spindle or cutter deflection, and is furnished to a feedrate control unit 36 which in turn supplies a control signal to the N/C unit 32.

Figure 2:
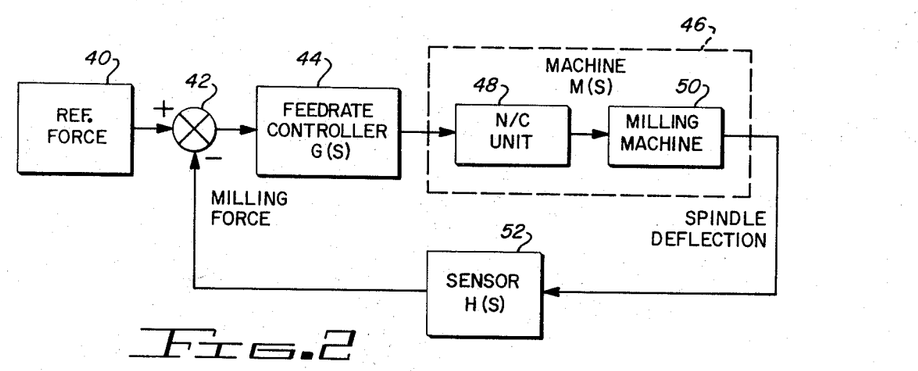
FIG. 2 is a block diagram of a feedrate control system therefore.

Now referring to FIG. 2, the system elements are shown in conventional feedback control configuration. Spindle deflection is determined by a sensor circuit 52 which may be wholly or partially disposed within sensor housing 34. Sensor circuit 52 converts the spindle deflection into a proportional milling force signal which is applied to a summing junction 42 along with a reference force signal obtained from a circuit 40.

The purpose of this comparison is to obtain an error signal which is equal to the difference between a preset reference force and actual milling force exerted on the spindle, and thus on the cutting tool. As previously noted, it has been discovered that control of feedrate in accordance with milling force only signfcantly reduces the probability of cutter breakage and undue wear while greatly increasing productivity of the machine. In addition, milling force can be easily determined by simple apparatus and techniques which require little or no modification of existing milling machines.

In the simplest embodiment, circuit 40 may comprise a potentiometer which provides an analog voltage to the summing junction 42. The potentiometer may be set at the beginning of the machining process and thereafter the feedrate will be controlled in accordance with that preset value. Alternatively, if a plurality of different cutting operations are to be controlled by the N/C unit 32, the reference forces may be preprogrammed into the D/C tape for that particular operation, along with the other machining instructions including desired feedrate. In such cases, circuit 40 may comprise a portion of the tape reader and buffer circuits included in N/C unit 32.

The error signal appearing on the output of summing junction 42 is supplied to a feedrate controller 44. The elements of the feedback system, and especially controller 44, must have a dynamic response to limit the peak cutter milling forces to value approximating that of the reference force set by circuit 40. In the simplest embodiment, feedrate controller 44 is constructed to coact with the presently used override circuits of known N/C units and therefore operates to reduce the preset feedrate when the reference force is exceeded during the milling process. This type of control is in accordance with previous automatic feedrate controls and has proved to be the most feasible from an operating and practical standpoint. However, it is also contemplated that the feedrate controller 44 be able to increase feedrate above the preset value if the reference force is in fact not exceeded furing the milling process. A further explanation of this type of control can be found in the detailed discussion of the improved feedrate controller discussed below.

Figure 3:
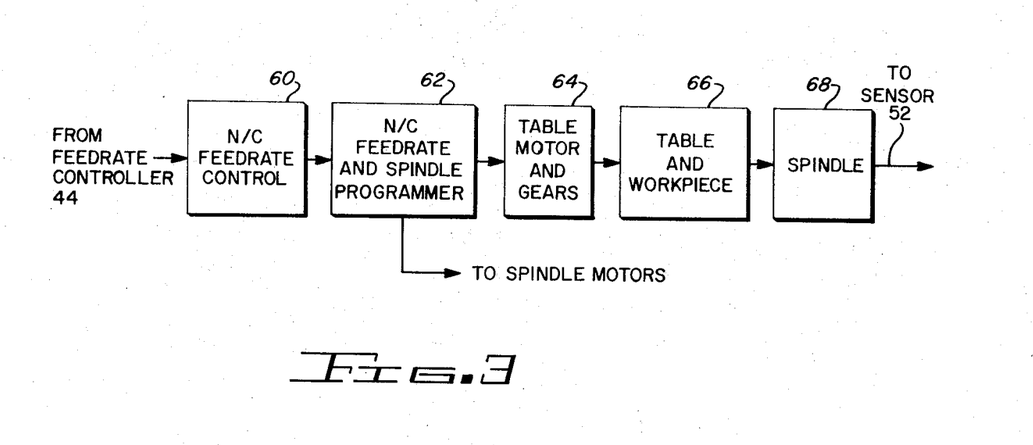
FIG. 3 is a block diagram of a portion of a typical numerically controlled milling machine.

The output of feedrate controller 44 is supplied to a milling machine block 46 which comprises an N/C control 48 and a milling machine 50. With particular reference to FIG. 3, in which milling block 46 is more completely detailed, the output from feedrate controller 44 may be applied to an N/C feedrate control circuit 60 which is disposed within N/C control 48. In existing numerical control units, external feedrate override is effected by the operator rotating a potentiometer shaft. With such a unit, circuit 60 may comprise a servomotor which rotates the shaft of that potentiometer in accordance with the magnitude and direction of the signal from feedrate controller 44.

The manual override potentiometer is usually disposed in a circuit which determines the clock frequency of the numerical control logic. The feedrate is determined in these units by dividing down, by appropriate logic circuitry, that clock frequency. Therefore, the potentiometer in circuit 60 may be operative to lower the clock frequency in proportion to the degree of shaft rotation. In a preferred embodiment of the system, the output signal from feedrate controller 44 may be connected into a logic circuit which directly controls the clock frequency, as by a variable frequency oscillator or the like.

The control signal from circuit 60 is fed to an N/C feedrate and spindle programmer circuit 62 which processes the instruction signals obtained from the preprogrammed N/C tape. These signals define the depth of cut, speed of spindle rotation, and the like. In most cases, the control signal from circuit 60 comprises the system clock pulses, and therefore controls the rate at which a logic means in programmer 62 provides speed and direction contol signals to one or more of the table motors, in correspondence with the instruction signals. Programmer 62 also supplies the speed and direction control signals to the spindle motor. These signals form no part of the feedrate control system.

The feedrate output signal from programmer 62 is applied to a table motor and gear arrangement 64 in and through appropriate mechanical linkage, the table motor and gear arrangement 64 moves a table and workpiece 66 at the desired feedrate.

Until the workpiece has actually come into contact with the cutting tool of the milling machine, the feedback loop for the feedrate control system is not completed. When contact is made between the cutting tool and the workpiece, the force exerted therebetween is designated as milling force and results in de-flection of the cutting element, and thus the spindle 68 of the milling machine, from its normally centered position. This deflection may occur in the X and Y directions, in the Z direction, or in all three coordinate directions. As explained previously, the resultant deflection of the spindle 68 is measured by sensor 52 whose output signal is thus proportional to actual milling force.

Since the feedback loop is not completed until the cutting element engages the workpiece, the milling process may proceed at the preprogrammed feedrate until contact is made. At that time, the feedback loop is completed and the feedrate is accordingly controlled in accordance with the deviation of actual milling force from the preset reference force.

It should be noted that the elements illustrated in FIG. 3 form no part of the instant invention. Rather, these elements merely exemplify some commonly known numerically controlled milling machines and are illustrated for purposes of explanation only. The improved feedrate controller and force sensor of this invention may be used with any feedrate system, such as that illustrated in FIG. 2, and with any milling machine, conventional or numerically controlled. Feedrate control systems of this type, and particularly the force sensor and feedrate controller, require only that the feedrate of the milling machine be externally controllable and, that the machine spindle be accessible for deflection sensing.

Examples of how such a single input variable feedrate control system greatly increases machine productivity while yet being relatively inexpensive can be found in the aforementioned U.S. Pat. No. 3,602,090 and references cited therein. This invention is particularly concerned with an improved force sensor system for achieving even greater economy of installation and operation, and with an improved feedrate controller which effectively guards against undue cutter wear under certain operating conditions.

Figure 4:
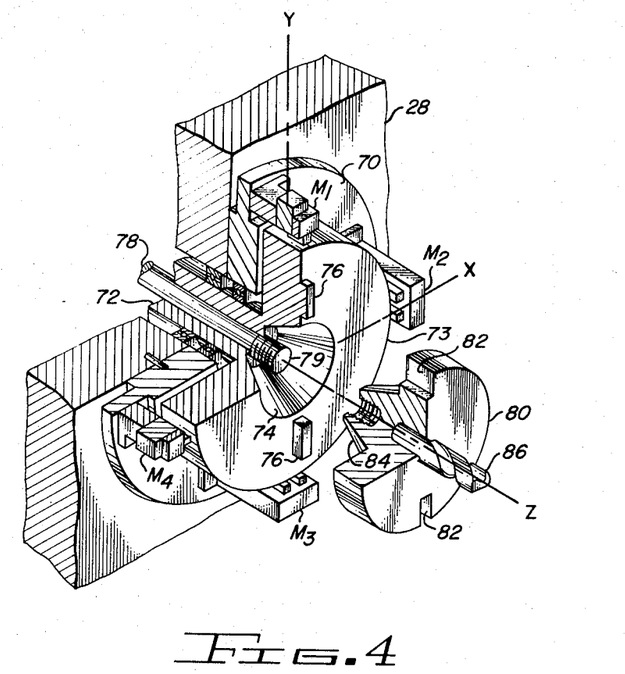
FIG. 4 is an exploded pictorial diagram showing the structure and assembly of a milling force sensor element.
Figure 5:
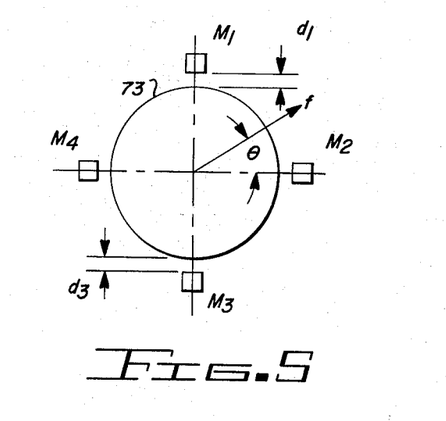
FIG. 5 is a coordinate diagram showing the force conventions utilized in describing the sensor of FIG. 4.
Figure 6A:
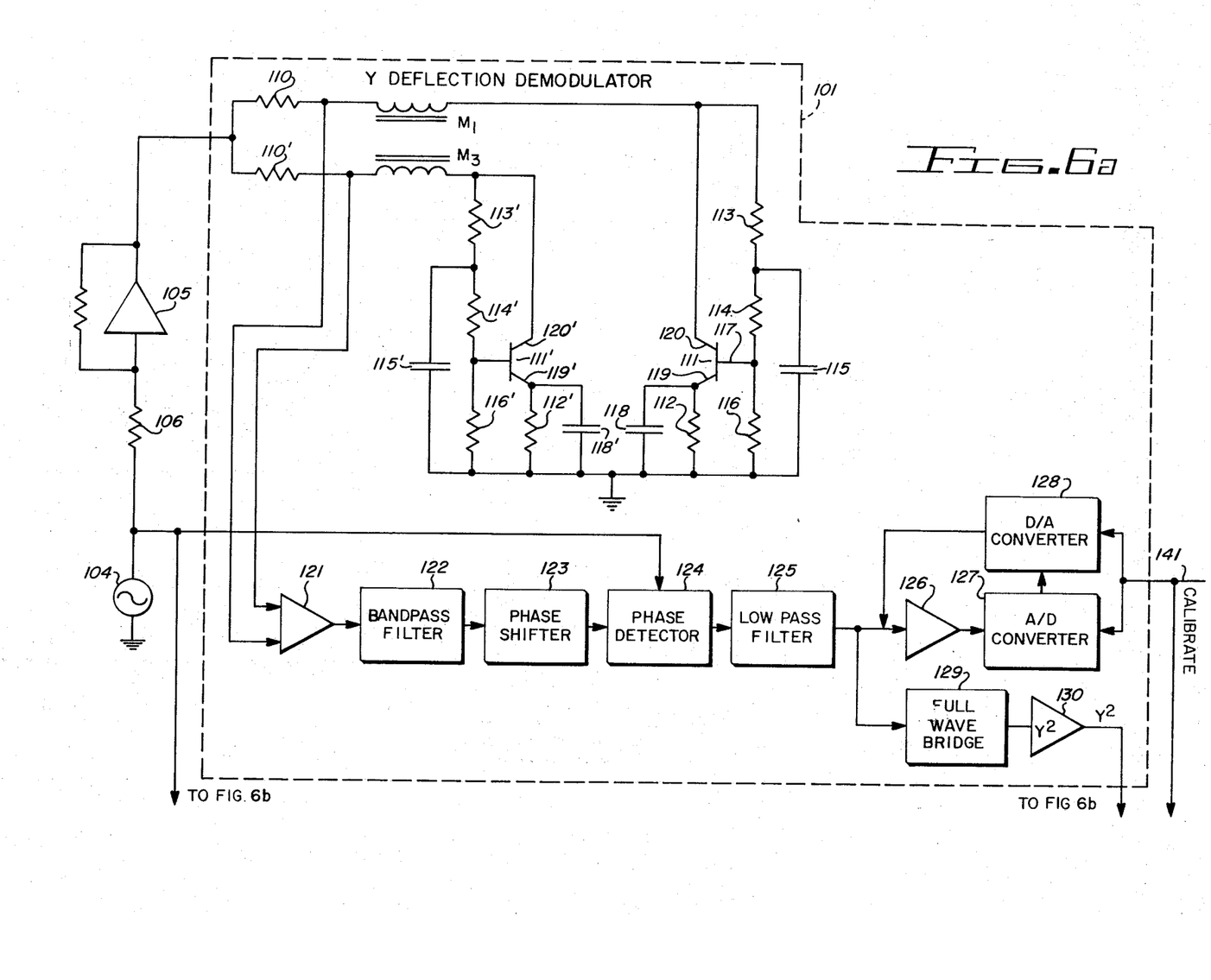
FIGS. 6a and 6b taken together present a partially schematic and partially block diagram of the improved system for sensing spindle deflection and developing a feedrate control signal therefrom.
Figure 6B:
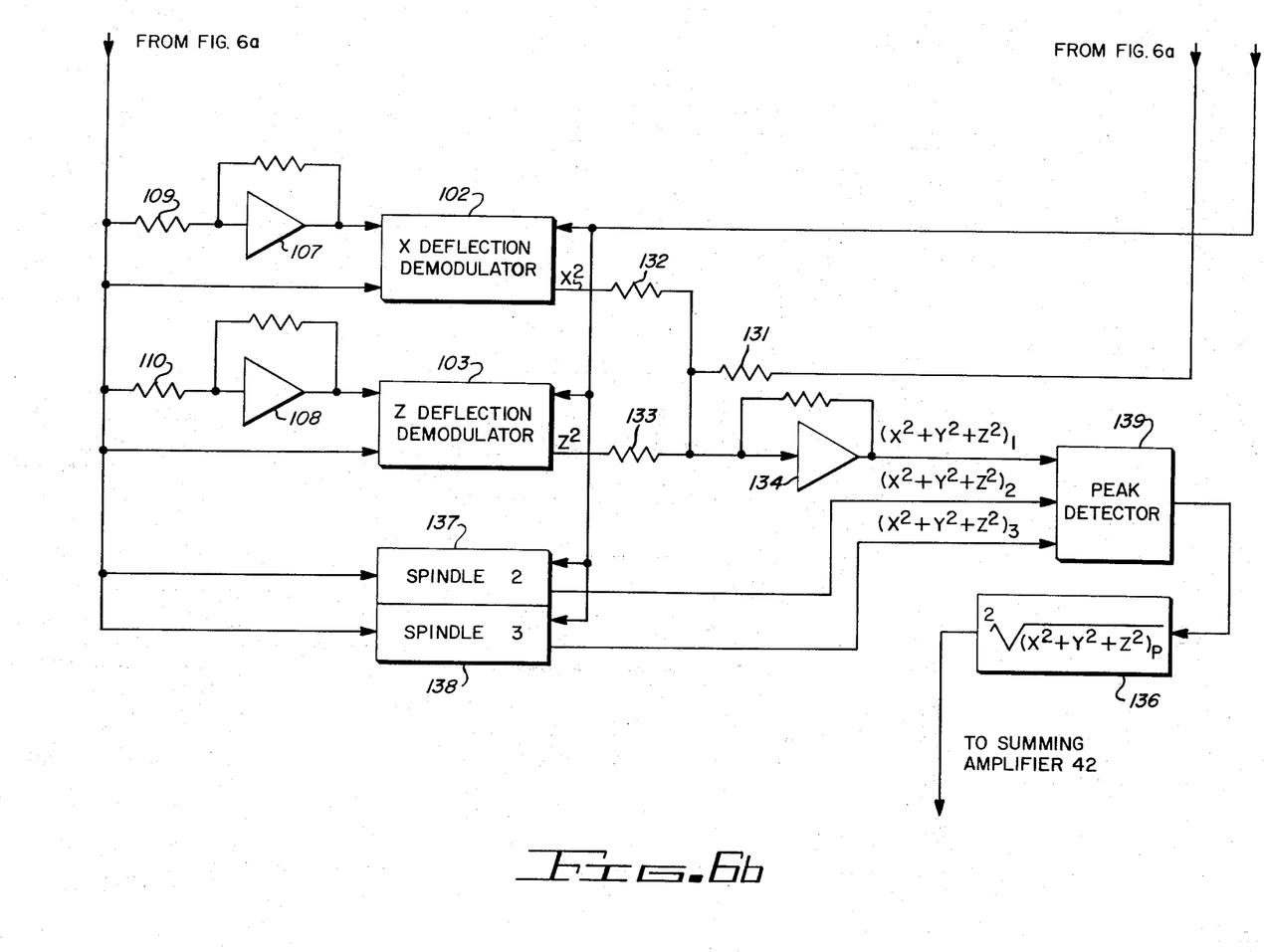

The improved force sensor can be best understood by reference to FIGS. 4 – 6. With particular reference to FIG. 4, the physical details of the sensor housing 34 and some of the elements of sensor circuit 52 may be appreciated. This exemplary structure is particularly designed for use with a milling machine of the cutter drawbar type in which a tool adapter is secured to the machine's spindle by means of a drawbar passing through the center of the spindle. In turn, the tool adapter supports a cutting tool.

The cutter mechanism 28 includes an external bearing holder 70 which supports for rotation the end of a spindle 72 extending along the transverse or Z axis of the milling machine. Disposed at the end of spindle 72 is a relatively enlarged spindle nose portion 73 which has on a front surface thereof a plurality of projections 76 which are dimensioned to closely engage with corresponding recesses in a tool adapter. Also included in nos portion nose is a centrally located, tapered recess 74. A cutter drawbar 78 extends throughout the length of spindle 72 and has a threaded end 79 terminating within the aperture formed by tapered recess 74.

The tool adapter may be configured like that illustrated at 80 in FIG. 4 and includes a plurality of recesses 82 which are dimensioned to be closely engaged by the plurality of projections 76 on spindle nose 73, a tapered projection 84 which is designed to cofit with the tapered recess 74, and a centrally located aperture 83 which is adapted to be threadedly engaged with end 79 of cutter drawbar 78. In turn, tool adapter 80 has any desired cutting tool 86 centrally located and projecting from the outside face thereof.

As is well known, such tool adapters are provided to accommodate fast and accurate cutting tool changes without necessity for realignment or other adjustments to the milling machine. The tapers on recess 74 and projection 84 are equivalent and may comprise, for example, a standard No. 50 machine taper. When a tool is to be attached to the spindle, it is first inserted into the tool adapter. The tool adapter is then placed into contact with spindle nose portion 73 and the cutter drawbar 78 threaded therein. After tightening, the cofitting of tapers 74 and 84 provides close alignment of the cutting tool, and the cofitting of projections 76 and recesses 82 provides a positive drive to the cutting tool during spindle rotation.

Spindle deflection is measured, in the X and Y directions, by a plurality of magnetic transducers $M_1$, $M_2$, $M_3$, and $M_4$ which are disposed in a quadrature relationship around the circumference of spindle nose portion 73. In the embodiment of FIG. 4, transducers $M_1 - M_4$ are simply bolted to a cutaway portion of the external bearing holder 70. As shown in FIG. 5, the spindle nose portion 73 is displaced a distance $d_1$ from transducer $M_1$ and a distance $d_3$ from transducer $M_3$. Assume that the cutting tool is moving relative to the workpiece in the negative Y direction. As the cutting tool engages the workpiece, the spindle nose portion 73 is deflected upwardly. Since the tranducers $M_1$ and $M_3$ are secured to the stationary spindle mechanism 28, the distance $d_1$ decreases and the distance $d_3$ increases. The windings of the transducers are connected to a differential amplifier arrangement. If the sensed voltages are of equal magnitude when the dimensions $d_1$ and $d_3$ are equal, then an unbalance in these voltages occurs when the cutting tool is deflected in the Y direction. The resultant difference voltage obtained from the differential amplifier may then be used to provide a signal proportional to spindle deflection in that direction.

While consideration of the X and Y axes only has been given in the above description, those skilled in the art will appreciate that Z axis deflection can be monitored in a similar manner such as that described in conjunction with FIG. 7 in the above referenced U.S. Pat. No. 3,602,090.

The foregoing has been a description of a generalized environment for the present invention for providing a better understanding of its function and the improved performance resulting from its incorporation into such an exemplary system. Attention is now directed to FIG. 6 which presents a detailed illustration of the system components encompassing the present invention and which are directed to providing a more consistently accurate feedrate correction signal to the feedrate controller 44. It will be observed in FIG. 6 that only the Y deflection demodulator 101 is presented in detail inasmuch as the X deflection demodulator 102 and the Z deflection demodulator 103 are essentially identical thereto.

An audio frequency oscillator 104 drives an operational amplifier 105 through an isolation resistor 106. The operational amplifier 105 simply provides power gain and isolatiion of the oscillator circuitry from the D-C bias circuitry. Operational amplifiers 107 and 108, with isolation resistors 109 and 110, perform identical functions for the X and Z circuitry, respectively. The operational amplifier 105 drives a pair of virtually identical, parallel circuits in which one leg contains the winding $M_1$ and the other leg contains the winding $M_3$.

It will be observed that each leg consists essentially of a series circuit containing, as one element, the deflection sensor winding as well as a pair of resistors and a field effect transistor. Referring, by way of example, to the leg containing the winding $M_1$, the series circuit includes a first resistor 110, the winding $M_1$, an F.E.T. 111 and and resistor 112. Resistors 113 and 114, in conjunction with capacitor 115, effect a low pass filter calculated to cut off far below the frequency at which the oscillator 104 operates and therefore provides a d-c bias at the gate electrode 117 of the F.E.T. 111, the resistor 116 completing the bias netowrk to common. The capacitor 118, disposed in parallel with the resistor 112, serves to stabilize the d-c voltage appearing at the drain electrode 119 of the F.E.T. 111.

A problem associated with the prior art such as disclosed in U.S. Pat. No. 3,602,090 is that variations in temperature of the sense windings proves an appreciable departure from the accuracy desired in developing a feedrate correction signal. The above-described circuitry compensates for such deviations in temperature which result from the tool operating on the work piece as well as from the cooling and lubricating medium, typically cutting oil, which is recirculated and directed to the area where the work is being carried out. Hence, as those skilled in the art appreciate, the temperature of the sense coils $M_1$ and $M_3$ are subject to considerable temperature changes during a machining operation. It will be noted that the sensed signal is taken off the electrical junction between the resistor 110 and the coil $M_1$. Further, it will be noted that, characteristically, the coil $M_1$ resistance decreases as its temperature decreases. Since the resistor 110 and the coil $M_1$ are in series with the F.E.T. 111, as well as the resistor 112, the F.E.T. 111 can bring about the desired temperature compensation by function as a variable resistor with a simulated temperature response which is the inverse of that exhibited by the coil $M_1$. As the temperature of the coil decreases and the coil resistance accordingly decreases, the voltage between the gate electrode 117 and the source electrode 120 changes to decrease current flow between the source electrode 120 and the drain electrode 118 therefore presents the appearance of an element having higher resistance in sereis with the resistor 110 and the coil $M_1$. When the temperature of $M_1$ increases resulting in an increase of its resistance, the gate-source voltage of the F.E.T. 111 responds to permit increased current flow through the F.E.T. to present an element of correspondingly decreased resistance. By adjusting the values of the components in accordance with the temperature-resistance characteristics of the coil $M_1$, close temperature compensation may be achieved across the temperature range normally encountered such that the amplitude of the signal appearing at the junction of the resistor 110 and the coil $M_1$ is dependent primarily upon the instantaneous reactance of the coil $M_1$ at the frequency issued by the oscillator 104. The reactive component attributable to the coil $M_1$ is, in turn, dependent upon the inductance of the coil which varies with the distance of $d_1$ in the well known manner.

The coil $M_3$ is provided with identical temperature compesnating circuit shown in FIG. 6 as having components with primed numbers. Theoretically, the temperature-resistance characteristics of the coils $M_1$ and $M_3$ could be individually measured and subsequently compensated by selecting the components in the compensation circuits according to the individual results of such measurement. In practice, however, it has been found that the characteristics of coils wound to the same specification do not diverge sufficiently to justify this additional refienement in compensation. Thus, the circuits may comprise identical off the shelf components with no special effort towards selection necessary in the ordinary case.

If there is no deflection of the spindle 73 and the assumption is made that there is no inherent runout, the amplitude of the audio frequency signals appearing at the junction of the resistor 110 and the coil $M_1$ and the resistors $110^1$ and the coil $M_3$ will be equal. These signals are applied as separate inputs to a differential amplifier 121 which will issue an output proportional to the amplfied difference of the two input signals, and therefore, in the case of no deflection an no runout, will issue a signal having no a-c component. However, any deflection of the spindle 73 having a component in the Y direction will alter $d_1$ and $d_3$ in opposite directions resulting in a differential a-c voltage being impressed across the inputs to the differential amplifier 121 because of the change in reactance of the coils $M_1$ and $M_3$. The resulting a-c signal issued by the differential amplifier 121 will have a frequency equal to that generated by the oscillator 104 and an amplitude which corresponds to the degree of deflection in the Y direction. This signal is passed through a bandpass filter 122 which has a center frequency equal to the operating frequency of the oscillator 104 and therefore functions to reject noise and any second order harmonics which may be present. The signal is then passed through a phase shifter 123 which is simply adjusted to bring the signal at the output thereof into correspondence with the phase of the signal generated by the oscillator 104 inasmuch as the magnetic circuits, the bandpass filter 122, etc. will bring about some phase shift which must be compensated for to achieve the desired accuracy in the succeeding circuits. Thus, assuming some deflection of the spindle 73 in the Y direction, the a-c signal present at the output of the phase shifter 123 will be either in phase with the signal generated by the oscillator 104 or 180° out of phase therewith according to the direction of deflection.

This signal, along with a reference signal from the oscillator 104 which has been "squared" by a zero crossing detector is fed to a phase detector 124 which converts the signal to full wave rectified, unfiltered, pulsating d-c either positive or negative polarity according to the direction of deflection. The value of utilizing the phase detector 124 lies in its very high rejection of signals which are 90° out of phase with the reference signal from the oscillator 104. Such spurious signals, even those having a frequency identical to the reference frequency or to a harmonic thereof tend to average out. In particular, high quadrature rejection is achieved of signals developed across the resistance of the coils.

The assumption that the spindle will have no runout cannot be observed in a practical environment, and runout results in some amplitude modulation of the audio frequency "carrier" which is the basic reference frequency issued by the oscillator 104. The runout, of course, occurs at a much lower frequency than that of the oscillator 104 and varies according to the speed of the spindle. The low pass filter 125 smooths the demodulated signal from the pahse detector 124 and also averages the signal component originating as runout to almost zero. Any D-C runout component and also D-C drift in the system, however, may be compensated by the circuit loop comprising amplifier 126, analog-to-digital converter 127 and digital-to-analog converter 128. When a tool adapter 80 is fitted to the spindle 73 and the spindle is rotating, the A-D converter 127 is activated by providing a calibrate signal on the line 141 which may, by way of example, simply lead to a push button for momentarily energizing the converter 127. When a new tool and tool holder 80 is in position and the calibrate function has been activated, a signal appearing at the input to the D-C amplifier 126 is amplified and used to drive the A-D converter 127 which issues a trial signal to the D-A converter. The D-A converter responds with a feedback d-c voltage in opposition to that resulting from the runout such that the d-c voltage level at the input to the amplifier 126 is altered to the algebraic sum of the two voltages. This process is repeated in the well known manner to achieve a net zero voltage condition at the output of the amplifier 126 whereat the steady state d-c voltage issued by the D-A converter 128 is equal in amplitude and opposite in polarity to the signal resulting from runout alone. Thus, when deflection of the spindle under normal operating conditions occurs, the signal component attributable to runout will be compensated out, in proper polarity, and the remaining signal portion represents deflection only. This signal is then passed through a full wave bridge rectifier 129 to provide an absolute value, single polarity signal to squaring amplifier 130. Thus it will be understood that squaring amplifier 130, during normal operation, issues a signal $Y^2$ which represents the square of the deflection in the Y direction without regard to polarity and with no drift or runout component. The reason for squaring the deflection signal will become more apparent as the description proceeds.

The circuitry in the X deflection demodulator 102 and the Z deflection demodulator 103 is essentially identical to that found in the previously described Y deflection demodulator 101 and thus will not be described in detail. It will be understood, of course, that the signal $X^2$ issued from the X deflection demodulator represents a horizontal deflection component and the signal $Z^2$ issued from the Z deflection demodulator 103 represents deflection in the axial direction of the spindle. Those skilled in the art will understand that many machine installations need not be provided with a Z axis channel.

The signals $X^2$, $Y^2$ and $Z^2$ are mixed through summing resistors 131, 132 and 133 such that the output signal from operational amplifier 134 represents the sum $(X^2+Y^2+Z^2)_1$. For a single spindle machine, this signal may be applied directly to the input terminals of the square rooter circuit 136 in order that the signal feedback to the summing amplifier 42 (FIG. 2) is the square root of the sum of the force vector squares. Thus, a true vector sum is extracted and utilized to alter the feedrate. It will be noted that, if the force vectors were not first squared before mixing, a simple arithmetic sum rather than a vector sum would result, and such an arithmetic sum does not provide a true indication of the actual deflection and therefore is only an approximate parameter for developing the correction signal. (Note: We used an arithmetic sum on two of our first units.)

More sophisticated machine tools are provided with two and even three or more spindles which may be operating upon a work piece simultaneously. It is necessary, in that event, to observe the milling force of all the spindles with feedrate control adjusted in accordance with the largest observed deflection from among the several functioning spindles. Thus, spindle number 2, 137, and spindle number 3, 138, in the exemplary embodiment of FIG. 6 are each provided with a system for developing, respectively, in terms $(X^2+Y^2+Z^2)_2$ and $(X^2+Y^2+Z^2)_3$. These signals are impressed, along with the signal $(X^2+Y^2+Z^2)_1$ to the input terminals of a peak detector 139 which functions to select at all times the single largest signal present from among the three inputs to issue to the square rooter circuit 136 in order that the feedrate control is effected in accordance with the spindle carrying tool under the most stress.

In order to further decrease the possibility of tool damage it has been found desirable to decrease the feedrate in some predetermined proportion, such as by a factor of one-half, as the cutting tool or tools are initially brought into contact with the workpiece; that is when there is no spindle deflection or very slight spindle deflection as the tool just touches the work piece. Means for achieving this function are disclosed in the previously referenced U.S. Pat. No. 3,602,090 in conjunction with FIG. 8 thereof, and the incorporation of such threshold detection means into the presently described system is contemplated and desirable.

While the principles of the invention have now been made clear in an illustrative embodiment, there will be immediately obvious to those skilled in the art many modifications of structure, arrangement, proportions, the elements, materials, and components, used in the practice of the invention which are particularly

I claim:

1. In a force sensor which converts deflection of a milling machine spindle into a proportional milling force signal for use with a feedrate control system responsive thereto, including: first and second magnetic transducer means, each transducer means including a winding; means supporting said first and second transducer means in proximity to the circumference of the spindle but opposed along a diameter thereof; an a-c source coupled to said windings; means for deriving a difference signal from said windings, which difference signal includes a component having a frequency equal to that of said a-c source and is amplitude modulated in accordance with the relative deflection of the spindle along said diameter; and a demodulating means for converting said amplitude modulated component into a d-c milling force signal; wherein the improvement comprises:
   a) a differential amplifier having separate inputs coupled to said first and second transducer means for issuing said difference signal;
   b) a bandpass filter means for removing signal components from said difference signal which have a frequency other than that of said a-c source;
   c) a phase detector connected to the output of said bandpass filter and to said a-c source for issuing demodulated signal corresponding to the difference signal components in phase with and 180° out of phase with respect to said a-c source; and
   d) a low pass filter for converting said demodulated signal to a smooth d-c signal.

2. The system of claim 1 which further includes means for devloping an absolute value signal of a predetermined polarity from said smooth d-c signal, regardless of the polarity thereof.

3. The system of claim 2 in which said first and second magnetic transducer means cooperate to develop a Y difference signal representative of spindle deflection in its Y axis, said demodulating means comprising a Y channel demodulator issuing a Y channel d-c signal; said system further including:
   a) third and fourth magnetic transducer means disposed in quadrature to said first and second magnetic transducer means for developing an X difference signal representative of spindle deflection in its X axis;
   b) an X demodulator identical to said Y demodulator for issuing an X channel d-c signal;
   c) first squaring amplifier means for squaring said Y channel d-c signal to provide a $Y^2$ signal;
   d) second squaring amplifier means for squaring said X channel d-c signal to provide an $X^2$ signal; and
   e) means for summing said $X^2$ and said $Y^2$ signals to provide an $X^2+Y^2$ signal 4. The system of claim 3 which further includes means for taking the square root of said $X^2+Y^2$ signal to provide a $\sqrt{X^2+Y^2}$ signal.

5. The system of claim 4 in which each of a plurality of deflection sensors associated with a corresponding plurality of spindles each issues a $\sqrt{X^2+Y^2}$ signal having a magnitude according to the deflection of the corresponding spindle, which system further includes means for selecting the $\sqrt{X^2+Y^2}$ signal having the greatest magnitude.

6. The system of claim 3 which further includes:
   a. means for developing a $Z^2$ signal representing axial deflection of the spindle;
   b. means for summing said $X^2$, said $Y^2$ and said $Z^2$ signals to provide an $X^2+Y^2+Z^2$ signal; and
   c. means for taking the square root of said $X^2+Y^2+Z^2$ signal to provide a $\sqrt{X^2+Y^2+Z^2}$ signal.

7. The system of claim 6 in which each of a plurality of deflection sensors associated with a corresponding plurality of spindles each issues a $\sqrt{X^2+Y^2+Z^2}$ signal having a magnitude according to the deflection of the corresponding spindle, which system further includes means for selecting the [ $\sqrt{X^2+Y^2}$ ] $\sqrt{X^2+Y^2+Z^2}$ signal having the greatest magnitude.

* * * * *

PO-1050
(5/69)

UNITED STATES PATENT OFFICE
CERTIFICATE OF CORRECTION

Patent No. 3,777,125  Dated December 4, 1973

Inventor(s) William J. Whetham

It is certified that error appears in the above-identified patent and that said Letters Patent are hereby corrected as shown below:

Claim 7, delete the following: $[^2\sqrt{X^2 + Y^2}]$

Signed and sealed this 16th day of April 1974.

(SEAL)
Attest:

EDWARD M. FLETCHER, JR.
Attesting Officer

C. MARSHALL DANN
Commissioner of Patents